United States Patent
Bugaud

(10) Patent No.: US 7,164,813 B2
(45) Date of Patent: Jan. 16, 2007

(54) BRAGG GRATING PRESSURE SENSOR

(75) Inventor: Michel Bugaud, Argenteuil (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/529,493

(22) PCT Filed: Sep. 26, 2003

(86) PCT No.: PCT/FR03/50068

§ 371 (c)(1),
(2), (4) Date: Mar. 29, 2005

(87) PCT Pub. No.: WO2004/029570

PCT Pub. Date: Apr. 8, 2004

(65) Prior Publication Data
US 2006/0008196 A1    Jan. 12, 2006

(30) Foreign Application Priority Data
Sep. 30, 2002   (FR)   .................................. 02 12062

(51) Int. Cl.
G02B 6/00   (2006.01)

(52) U.S. Cl. ...................................................... 385/13
(58) Field of Classification Search ................. 385/12, 385/13, 37
See application file for complete search history.

(56) References Cited

U.S. PATENT DOCUMENTS

| 5,892,860 | A  | * | 4/1999 | Maron et al. ................. 385/12 |
| 6,278,811 | B1 |   | 8/2001 | Hay et al. |
| 2001/0019103 | A1 |   | 9/2001 | Sugai et al. |

FOREIGN PATENT DOCUMENTS

| DE | 196 48 403 | 4/1998 |
| EP | 1 008 840 | 6/2000 |

* cited by examiner

Primary Examiner—Sarah Song
(74) Attorney, Agent, or Firm—Oblon, Spivak, McClelland, Maier & Neustadt, P.C.

(57) ABSTRACT

A pressure sensor with a Bragg grating that may be particularly applicable to the chemical industry and for example includes an optical fiber and a Bragg grating formed in a portion of the fiber, submitted to pressure, and a lateral support of the portion. The portion is submitted to a compression prestress with a small value compared with a measurement range of the sensor.

19 Claims, 4 Drawing Sheets

BRAGG GRATING PRESSURE SENSOR

TECHNICAL DOMAIN

This invention relates to a pressure sensor with Bragg grating.

It is particularly applicable to the chemical industry, for measuring fluid pressure, for example the pressure in liquid hydrocarbons.

STATE OF PRIOR ART

Bragg grating pressure sensors are already described in the following documents:

[1] EP 1 008 840A, "Optical pressure sensor and measuring device provided with such a pressure sensor", invention by M. Voet, M. Bugaud and P. Ferdinand

[2] United States patent application 2 001 001 9103A, "Optical fibre sensor", invention by E. Sugai, K. Watabe, K. Yamaga and S. Fujita In these known pressure sensors, the optical fibre in which the Bragg grating is formed can be moved laterally, which could damage this optical fibre.

PRESENTATION OF THE INVENTION

The purpose of this invention is to overcome the disadvantage mentioned above.

Specifically, the purpose of this invention is a pressure sensor comprising an optical wave guide, preferably an optical fibre, and a first reflecting element, preferably a Bragg grating, formed in a portion of this optical wave guide, this portion being subjected to pressure, this sensor being characterised in that it also comprises means of lateral support of the portion of optical wave guide.

In order to prevent any hysteresis in the sensor response, particularly in the vicinity of zero pressure, a slight compression prestress is applied to this portion of the optical wave guide (preferably an optical fibre).

A slight compression prestress means a compression prestress with a small value compared with the measurement range of the sensor.

According to a first preferred embodiment of the sensor according to the invention, this sensor also comprises a housing and a membrane that is subjected to pressure and closes this housing, the sensor acting in compression, in which the portion of optical wave guide is placed in the housing and comprises first and second ends that are fixed to the membrane and to the housing respectively, and the means of lateral support comprise means of preventing buckling of the portion of optical wave guide when the latter is compressed.

According to a first particular embodiment of the invention, the means of preventing buckling of the portion of optical wave guide comprises a tube which is placed in the housing, and surrounds this portion of optical wave guide and comprises a first end that is at a spacing from the membrane and a second end that is fixed to the housing, and rings which are arranged one after the other in the tube between the housing and the membrane, and are spaced from each other by elastic elements, the portion of optical wave guide passing through them, and this portion of optical wave guide being free to slide in these rings.

Preferably, the elastic elements are elastic toric spacers.

Preferably, the elastic elements are made from an elastic material with a low coefficient of friction.

Preferably, this elastic material is cellular polytetrafluoroethylene.

In one variant embodiment, the means of preventing buckling of the portion of optical wave guide comprise a single ring that is fixed and integral with the housing and that guides the portion of optical wave guide over the entire length of the sensor.

According to a second particular embodiment of the invention, the means of preventing buckling of the portion of optical wave guide comprise rigid washers arranged one after the other in the housing, along the portion of optical wave guide, this portion of optical wave guide passing through them, together with elastic elements that are arranged one after the other in the housing, between this housing and the membrane, alternate with the rigid washers, and are integral with these rigid washers.

Preferably, the elastic elements form a single block of elastic material that traps the portion of optical wave guide.

According to a second preferred embodiment of the sensor according to the invention, the first and second ends of the portion of optical wave guide are fixed and the means of lateral support include an elastic element that traps the portion of optical wave guide and extends from the first end to the second end thereof, the pressure being applied to the periphery of this element.

The sensor according to the invention may also comprise a second reflecting element that is different from the first reflecting element and that is designed for measuring temperature, this second reflecting element being formed in a portion of the optical wave guide that is not subjected to pressure.

BRIEF DESCRIPTION OF THE DRAWINGS

This invention will be better understood after reading the description of the following example embodiments given below for guidance only and in no way limitative, with reference to the attached drawings on which.

DETAILED PRESENTATION OF PARTICULAR EMBODIMENTS

Figure 1A:
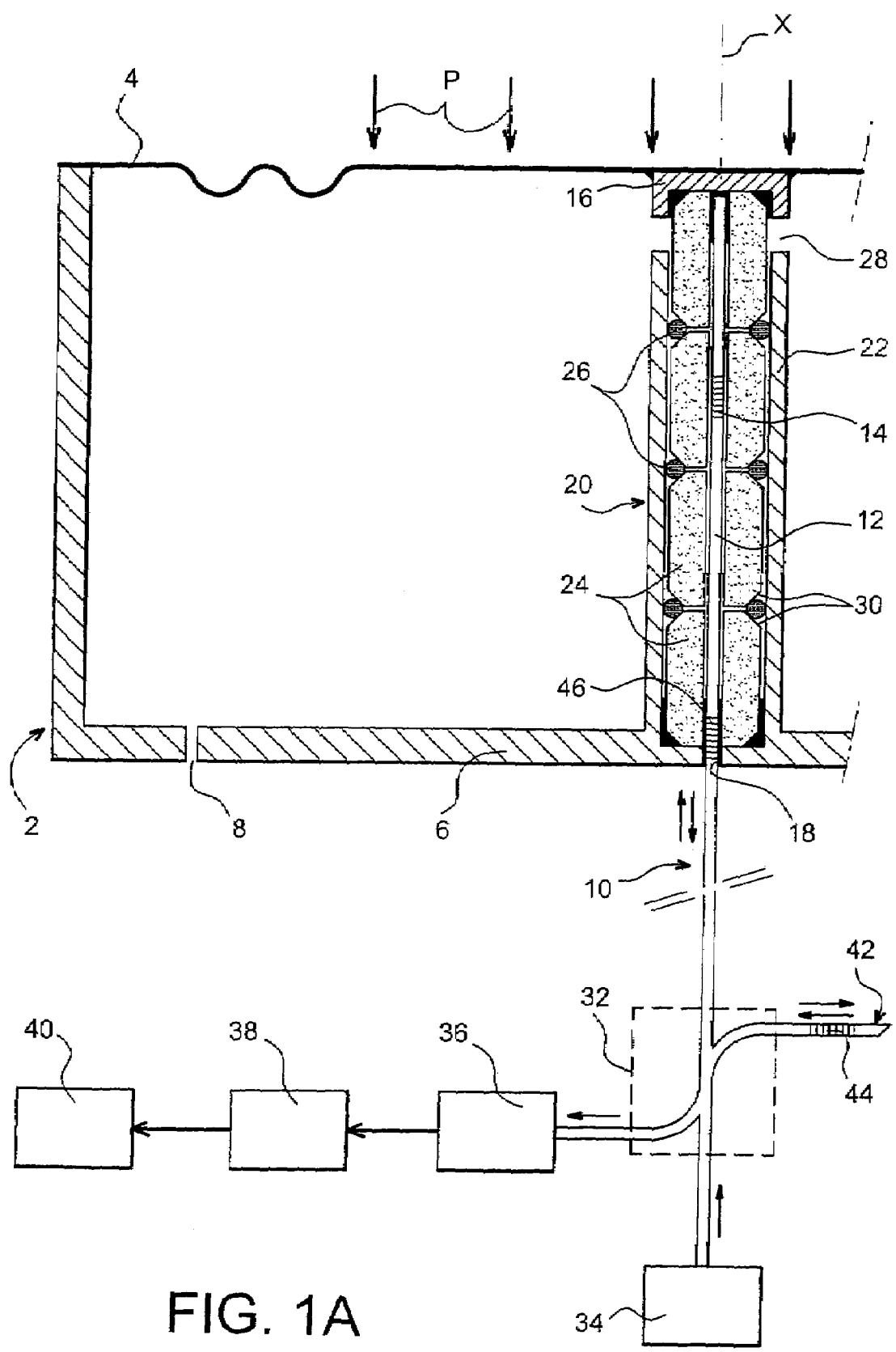
FIG. 1A is a diagrammatic and partial view of a unidirectional pressure sensor with membrane according to the invention comprising several rings.
Figure 1B:
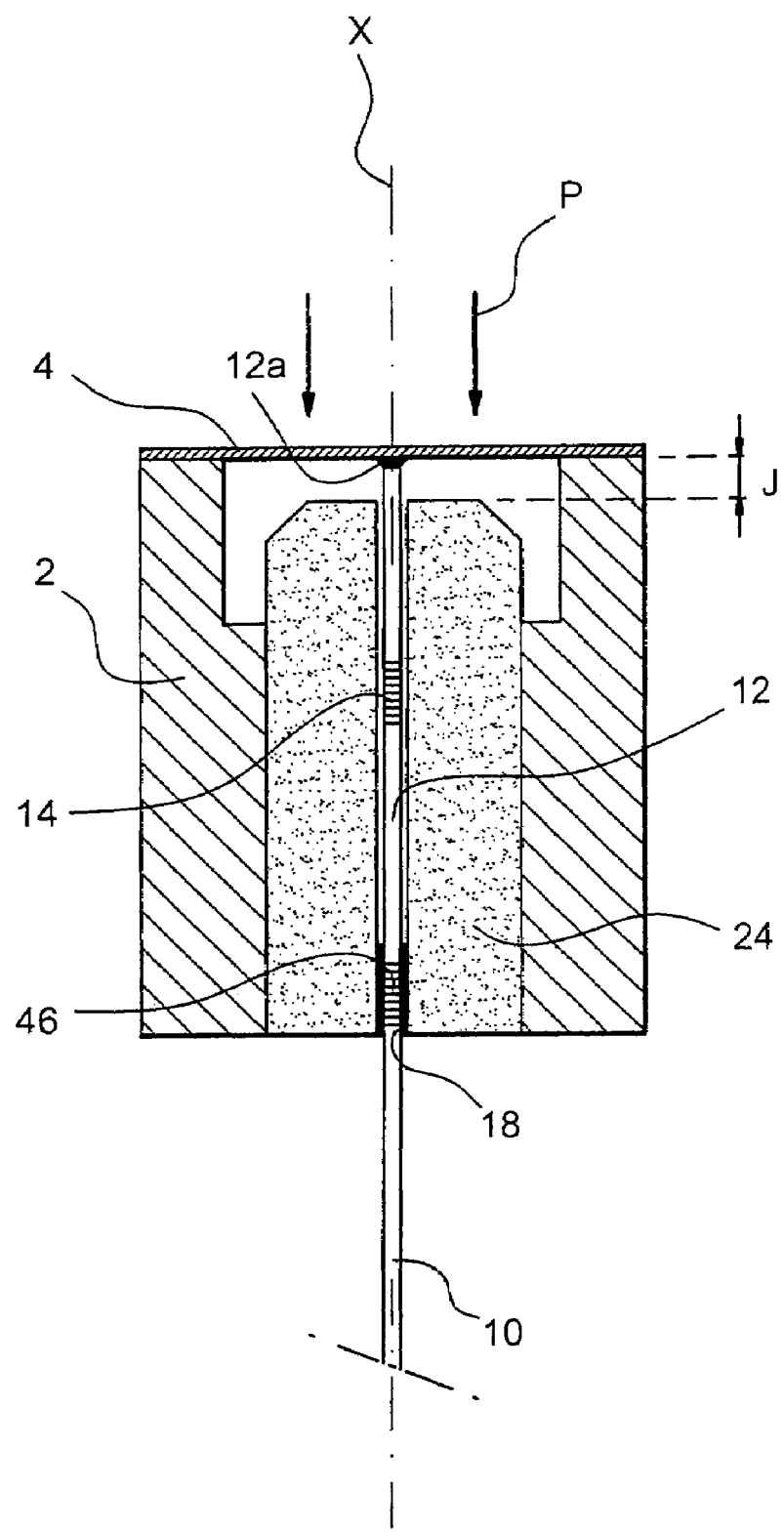
FIG. 1B is a diagrammatic and partial view of a variant of the sensor in FIG. 1A, comprising a single ring.
Figure 2:
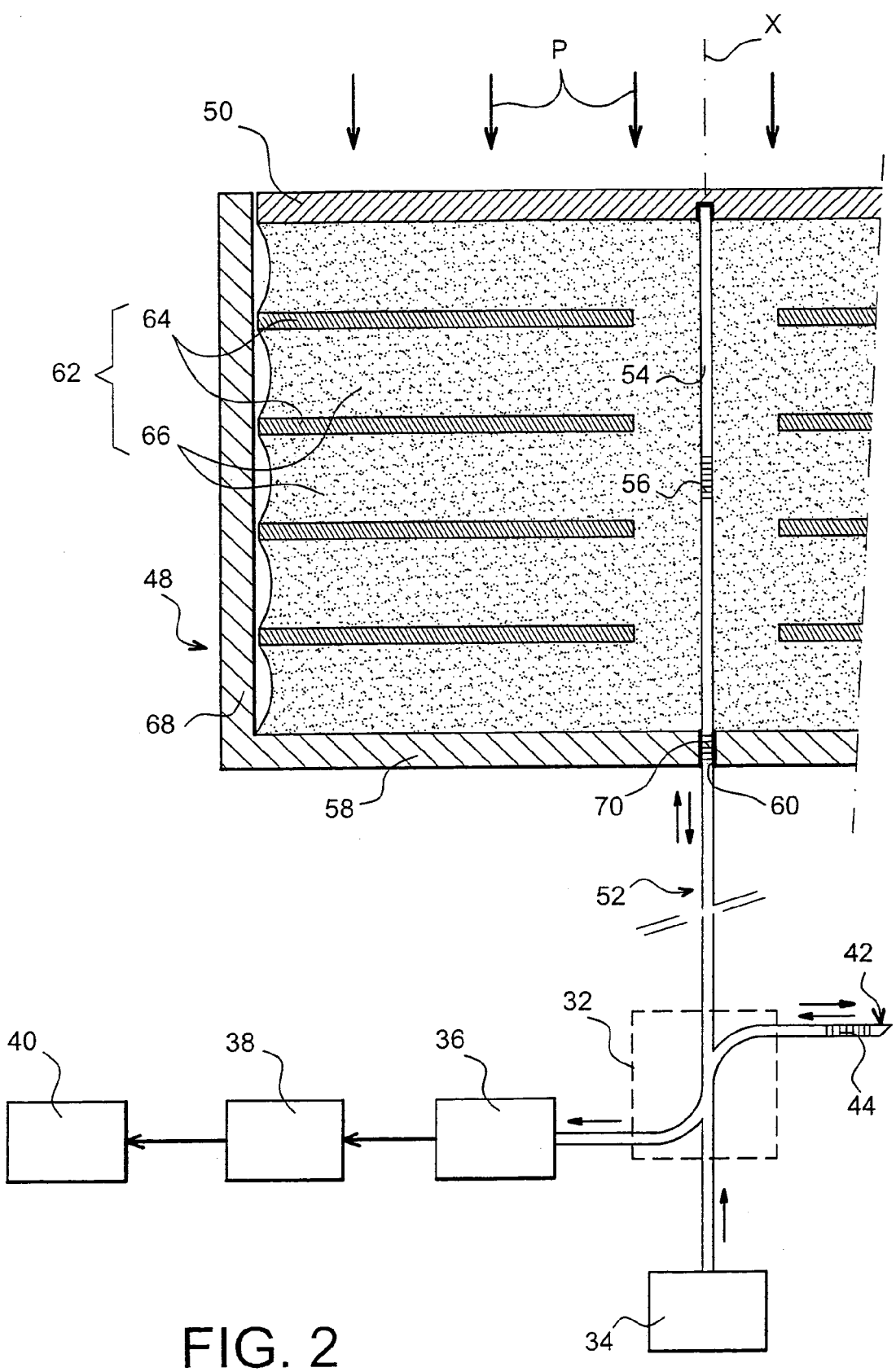
FIG. 2 is a diagrammatic and partial view of another variant of the sensor shown in FIG. 1A.

The pressure sensors according to the invention that are shown diagrammatically in FIGS. 1A, 1B and 2, are unidirectional membrane sensors: the pressure measurement is made therein unidirectionally by measuring the deformation of a membrane.

Figure 3:
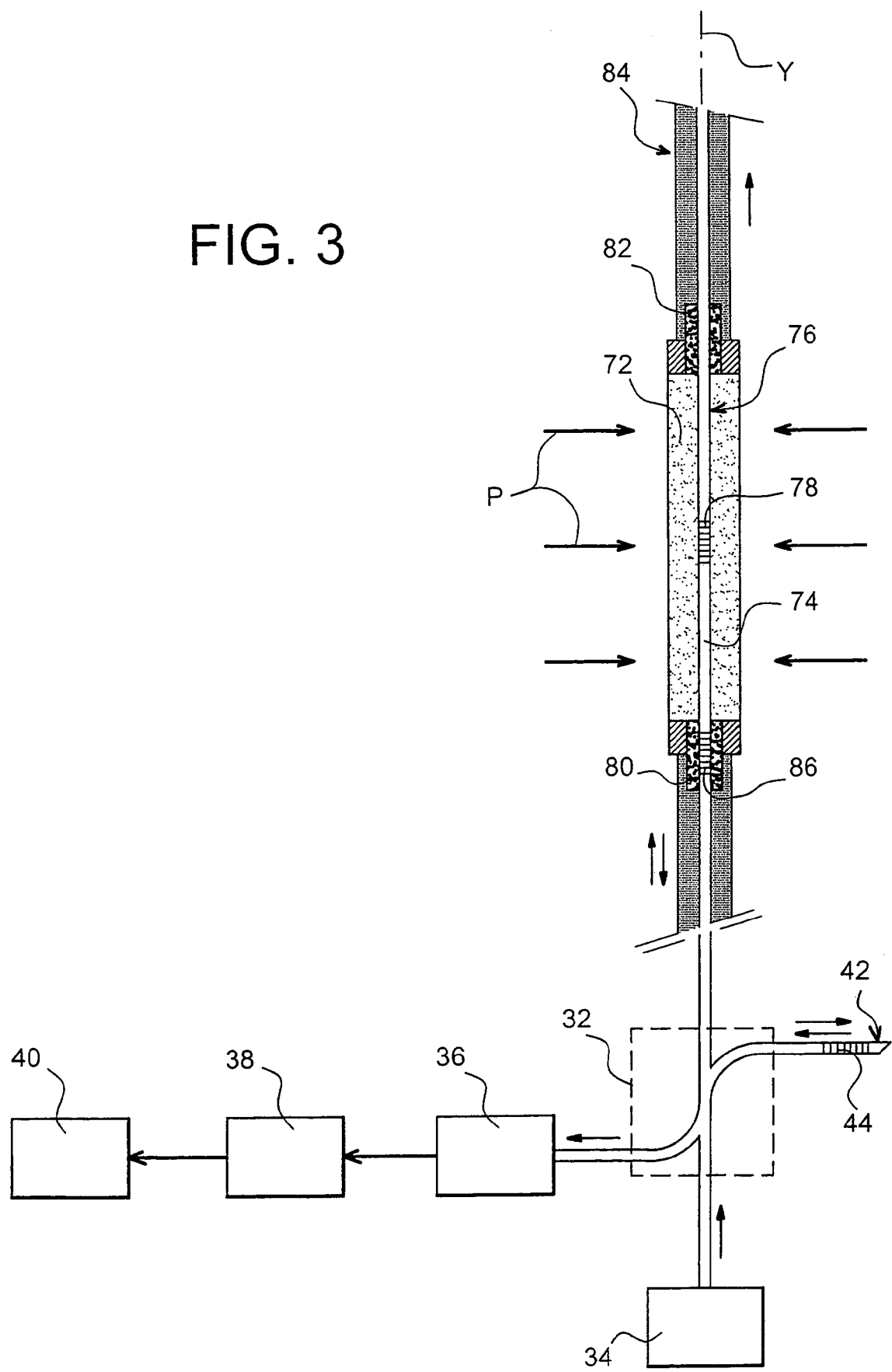
FIG. 3 is a diagrammatic view of an omnidirectional pressure sensor according to the invention.

The pressure sensor according to the invention that is diagrammatically shown in FIG. 3 is a hydrostatic omnidirectional sensor: the pressure measurement therein is made omnidirectionally by measuring the deformation of a reference volume.

Consider firstly the unidirectional membrane sensors according to the invention. In these sensors, an optical fibre is used in compression. The high strength of an optical fibre under compression (particularly a silica optical fibre) assures that these sensors have good reliability.

In the sensors in FIGS. 1A, 1B and 2, a membrane is used as a test body. The pressure to be measured is applied to this membrane. The membrane moves under the effect of this pressure, and its displacement is measured using a Bragg grating formed in an optical fibre.

The latter that is integral with the membrane is compressed. This compression causes an offset of the Bragg wavelength of the grating. Measurement of this offset enables measurement of the membrane displacement and therefore measurement of the pressure.

Specific means are provided in these sensors in FIGS. 1A, 1B and 2, to hold and to guide the optical fibre while preventing buckling of the latter when it is put into longitudinal compression. These specific means are made in two different ways in the examples in FIGS. 1A, 1B and 2.

More precisely, the pressure sensor conform with the invention that is diagrammatically shown in FIG. 1A, comprises a housing 2 and a deformable membrane 4 that closes the housing 2 and onto which the pressure P to be measured is applied. The membrane 4 deforms along a direction X under the effect of this pressure P.

The wall 6 of the housing 2 that is facing the membrane 4 comprises an opening 8 when the sensor is configured for measuring relative pressures.

The sensor also comprises an optical fibre 10 for which a portion 12 is located in the housing 2. A Bragg grating 14 is formed in this portion of optical fibre.

The sensor also comprises a mobile armature 16 located in the housing and that is fixed to the membrane 4 substantially at the centre of this membrane.

The portion 12 of the optical fibre extends parallel to the X direction. One end of this portion of optical fibre is cleaved perpendicular to the optical axis of this portion and is fixed to the mobile armature 16. The other end of this portion 12 is fixed to the wall 6 of the housing.

More precisely, this wall 6 comprises a sealed passage 18 for the optical fibre and the portion 12 of optical fibre is fixed to this wall 6, at this sealed passage 18.

In the sensor in FIG. 1A, the means 20 that prevent buckling of the optical fibre (or more precisely of the portion 12 of the optical fibre) comprises a guide tube 22, rings 24 and elastic elements. These elements are toric spacers 26 that are made of an elastic material with a low coefficient of friction, preferably cellular polytetrafluorethylene.

The tube 22 is located in the housing 2 and extends along the X direction around the portion 12 of the optical fibre. One end of this tube is fixed to the wall 6 and the other end of the tube 22 is separated from the mobile armature 16 by a space 28.

The rings 24 are arranged one after the other in the tube 22. These rings surround the portion 12 of optical fibre and are at a spacing from each other due to the elastic toric spacers.

In the example in FIG. 1A, each toric spacer enables spacing of two adjacent rings 24 by bearing on two chamfers 30, at 45°, respectively formed on the corresponding ends of these rings that are facing each other.

Thus, the portion 12 of optical fibre is guided in the set of rings 24, the latter being held in place longitudinally by the tube 22 that limits the offset of these rings, for example to ±0.5 μm.

The small axial and particularly longitudinal clearance that is distributed equally between the rings by the set of elastic toric spacers, or seals 26, allows the pressure to longitudinally compress the portion of fibre while preventing it from buckling.

Furthermore, the rings 24 are self-aligned regardless of the longitudinal displacement imposed by the pressure, due to the action of the elastic toric spacers 26 bearing symmetrically on these rings.

Furthermore, these toric spacers or seals 26 have a low hardness, only introduce a small compression resistance and only very slightly increase the inertia of the mobile assembly formed by the membrane 4, the mobile armature 16 and the fibre portion 12. Their coefficient of friction with respect to the tube 22 makes the effect of friction negligible.

Thus, the dynamic behaviour of the sensor is optimised.

Note that the ring closest to the mobile armature 16 may be fixed to this mobile armature and the ring closest to the wall 6 of the housing 2 may be fixed to this wall, but this is not compulsory.

The fibre portion 12 is subjected to a slight compression prestress, to prevent any hysteresis in the sensor response, particularly in the vicinity of zero pressure.

The same is true in the examples in FIGS. 1B, 2 and 3.

According to one variant diagrammatically shown in FIG. 1B (in which the same elements have the same references), only a single ring 24 is kept which is fixed and integral with housing 2 and guides the fibre portion 12 along the entire length of the sensor.

There is then no longer an elastic spacer. The compression stress of the fibre portion when the membrane is stressed is possible due to a clearance J located between the top of the ring 24 and the deformable membrane 4.

In one particular attachment method, the end 12a of the fibre portion 12 may be metallised and spot welded to the membrane 4, but it may also be fixed by any other means.

Similarly, the fibre portion 12 at the lower sealed passage 18 may be fixed to the ring 24 or the housing 2 by welding or brazing, if it is locally metallised, or by any other appropriate method (for example glue or crimping).

It is possible to provide a 2×2 type optical coupler 32 and a wide band light source 34 outside the housing 2, to measure the offset of the Bragg wavelength of the grating 14 contained in the portion 12 of the optical fibre.

Two coupler ports, are respectively connected to the light source 34 and to the end of the optical fibre 10, located outside the housing 2, to transmit light supplied by the source to this optical fibre.

The light reflected by the Bragg grating 14 is transmitted through another coupler port to a spectrum analyser 36 itself connected to electronic means 38 of processing signals output by this analyser.

These means 38 make it possible to determine the pressure P starting from modifications to light reflected by the Bragg grating, detected by the spectrum analyser 36.

The results of the measurements are output by display means 40 that are connected to the electronic processing means 38.

The fourth coupler port may be unused and preferably skew cleaved, or it may be connected to an optical fibre 42, the end of which is preferably skew cleaved and in which a reference Bragg grating 44 is formed.

This grating 44 then receives light emitted by the source 34 and thus makes it possible to calibrate the pressure sensor.

Preferably, another Bragg grating 46 is provided in a portion of the optical fibre 10 that is not compressed, for example at the sealed passage 18 of the wall 6 of the housing 2, at the location at which the portion 12 of the optical fibre is fixed.

It is clear that if the attachment is made by crimping, the crimping is preferably done at a location of the fibre at which it introduces no stress on the Bragg grating 46.

Crimping induces a displacement of spectrum lines, which is normally stable and could be compensated, but it is preferable that this should be avoided in the case of a sensor.

The optical spectrum analyser 36 can then measure the temperature by means of this other Bragg grating 46 (which is different from the grating 14).

It is thus possible to compensate for modifications generated during the pressure measurements and due to the influence of temperature on the Bragg grating 14 formed in the portion 12 of the optical fibre.

The sensor according to the invention that is shown diagrammatically in FIG. 2, also includes a housing 48 and a membrane 50 that encloses this housing.

In the example in FIG. 2, this membrane 50 is rigid and its periphery is not fixed to the housing 48 but is at a slight spacing from it, as can be seen in FIG. 2.

It is desired to measure the pressure P applied on this membrane along a X direction.

The pressure sensor in FIG. 2 also comprises an optical fibre 52 a portion 54 of which comprises a Bragg grating 56 designed to measure the pressure.

This portion 56 extends in the housing 48 parallel to the X direction. One end of this portion 56 of the optical fibre is fixed to the membrane 50 while the other end of this portion 56 is fixed to the wall 58 of the housing which is opposite to the membrane 50.

More precisely, the optical fibre 52 passes through this wall 58 through a sealed passage 60 provided for this purpose in the wall and the portion of optical fibre is fixed to this wall 58 at this sealed passage 60.

In the example in FIG. 2, the means 62 designed to prevent buckling of the portion 54 of optical fibre comprise rigid washers 64 arranged in the housing 48 parallel to each other and perpendicular to the X direction, and that surround the portion 54 of optical fibre. These washers are kept at a spacing from each other by elastic elements 66.

In the sensor shown in FIG. 2, these elastic elements 66 only form a single block that is made from an elastomer material, traps the portion 54 of optical fibre and extends from the membrane 50 to the wall 58 of the housing which is opposite to this membrane as can be seen in FIG. 2.

In the same way as this membrane 50, the rigid washers 64 may be slightly spaced from the sidewall 68 of the housing which extends parallel to the X direction.

When the pressure P is applied to the membrane 50, this membrane and the washers 64 then move along the X direction, being guided by this sidewall 68 of the housing 48.

Note that the one-piece assembly of the elements 66 may be made by moulding and injection of a one-piece elastomer that integrates the fibre portion 54.

Furthermore, the washers 64 are machined with a precision of 0.5 μm to limit the offset. These washers are made integral with the elastomer by adhesion during moulding; the same is true for the fibre portion.

To measure the pressure P using the Bragg grating, one also uses the wide band light source 34 coupled to the optical fibre 52 through the 2×2 type coupler 32, and the spectrum analyser 36., the electronic means 38 for processing signals output by this analyser 36 and the display means 40, which are referred to in the description of FIG. 1A, possibly with the optical fibre 42 containing the reference Bragg grating 44.

Another Bragg grating 70 could be again used to achieve temperature compensation. This grating 70 is also formed in the optical fibre 52, in a portion of the latter that is not subjected to pressure P, for example in the sealed passage 70, at the point at which the portion 54 of the optical fibre 52 is fixed.

The pressure sensor according to the invention, that is diagrammatically shown in FIG. 3, is a simple and inexpensive hydrostatic omnidirectional sensor.

This sensor comprises an elastic element 72 made of a polymer material and traps a portion 74 of an optical fibre 76.

A Bragg grating 78 is formed in this portion 74, enabling the pressure measurement.

The elastic element 72 is included between two anchor end pieces 80 and 82 that delimit the portion 74 of the optical fibre 76 and are rigidly fixed to this fibre.

These anchor end pieces form rigid stops that may for example be metallic and, if a fibre with a metallic coating is used, they may be fixed to this coating.

The elastic element 72 cooperates with the end pieces 80 and 82 to amplify the hydrostatic pressure effect and to convert it into a longitudinal deformation of the fibre portion 74 and therefore the Bragg grating 78.

The elastic element 72 is in the form of a cylinder of revolution about the portion 74 of the optical fibre.

The pressure P of a surrounding medium is applied to the periphery of this element 72, perpendicular to the Y axis of the portion 74 of optical fibre. The resulting deformation of the element is transmitted to the Bragg grating 78 through this element that amplifies the hydrostatic pressure applied to the fibre and therefore to the Bragg grating.

The thickness of the coating formed by this element is calculated as a function of the stiffness of the polymer material and the required amplification coefficient.

In order to measure the pressure P through the deformation of the Bragg grating, one again uses the wide band light source 34 and the 2×2 type optical coupler 32 connected to one end of the optical fibre 76 and as before connected to the spectrum analyser 36 itself connected to the electronic processing means 38 that are provided with measurement result display means 40.

FIG. 3 shows that the optical fibre 76 and therefore the pressure sensor according to the invention are integrated into an optical cable 84 and it can be seen that the optical coupler 32 is connected to one end of this optical cable 84.

Light which is transmitted to the Bragg grating 78 through this coupler and which is not reflected by this Bragg grating 78, propagates in the remainder of the optical cable 84.

The sensor in FIG. 3 could also be fitted with another temperature compensation Bragg grating 84. This Bragg grating 86 is also placed in a portion of the optical fibre 76 that is not submitted to pressure, for example in one of the two anchor end pieces 80 and 82.

The invention claimed is:

1. A pressure sensor comprising:
   an optical wave guide;
   a first reflecting element formed in a portion of the optical wave guide, the portion being submitted to pressure;
   means for lateral support of the portion of optical wave guide, wherein the portion of optical wave guide is submitted to a compression prestress with a small value compared with a measurement range of the sensor;
   a housing; and
   a membrane that is subjected to pressure and closes the housing,
   wherein the sensor acts in compression;

wherein the portion of the optical wave guide is placed in the housing and comprises first and second ends that are fixed to the membrane and to the housing respectively, wherein the means for lateral support comprises means for preventing buckling of the portion of optical wave guide when compressed, and further comprising a gap between the means for lateral support and the membrane.

2. A sensor according to claim 1, wherein the means for preventing buckling of the portion of optical wave guide comprise a tube, which is placed in the housing, and surrounds the portion of optical wave guide and comprises a first end that is at a spacing from the membrane and a second end that is fixed to the housing, and rings that are arranged one after the other in the tube between the housing and the membrane, and that are spaced from each other by elastic elements, the portion of optical wave guide passing through the rings, and the portion of optical wave guide being free to slide in the rings.

3. A sensor according to claim 2, wherein the elastic elements comprise elastic toric spacers.

4. A sensor according to claim 2, wherein the elastic elements are made from an elastic material with a low coefficient of friction.

5. A sensor according to claim 4, wherein the elastic material is cellular polytetrafluorethylene.

6. A sensor according to claim 1, wherein the means for preventing buckling of the portion of optical wave guide comprises a single ring that is fixed and integral with the housing and that guides the portion of optical wave guide over an entire length of the sensor.

7. A sensor according to claim 1, wherein the means for preventing buckling of the portion of optical wave guide comprises rigid washers arranged one after the other in the housing, along the portion of optical wave guide, the portion of optical wave guide passing through the rigid washers, together with elastic elements that are arranged one after the other in the housing, between the housing and the membrane, alternate with the rigid washers, and that are integral with the rigid washers.

8. A sensor according to claim 7, wherein the elastic elements form a single block of elastic material that traps the portion of optical wave guide.

9. A sensor according to claim 1, wherein the means for lateral support is fixed to an axial end of the housing opposite the membrane and extends along the optical wave guide toward the membrane.

10. A sensor according to claim 1 further comprising a gap between the housing and the membrane.

11. A pressure sensor comprising:
an optical wave guide;
a first reflecting element formed in a portion of the optical wave guide, the portion configured to be submitted to pressure;
a lateral support configured to support the portion of optical wave guide, wherein the portion of optical wave guide is submitted to a compression prestress with a value less than a measurement range of the sensor;
a housing; and
a membrane configured to be subjected to pressure and that closes the housing,
wherein the sensor is configured to sense a compressive force;
wherein the portion of the optical wave guide is disposed in the housing and comprises
first and second ends that are fixed to the membrane and to the housing respectively,
wherein the lateral support is configured to preventing buckling of the portion of optical wave guide when compressed, and
further comprising a gap between the lateral support and the membrane.

12. A sensor according to claim 11, wherein the lateral support comprises a tube, which is placed in the housing, and surrounds the portion of optical wave guide and comprises a first end that is at a spaced from the membrane and a second end that is fixed to the housing, and rings that are arranged one after the other in the tube between the housing and the membrane, and that are spaced from each other by elastic elements, the portion of optical wave guide passing through the rings, and the portion of optical wave guide being free to slide in the rings.

13. A sensor according to claim 12, wherein the elastic elements comprise elastic toric spacers.

14. A sensor according to claim 12, wherein the elastic elements are made from an elastic material with a low coefficient of friction.

15. A sensor according to claim 14, wherein the elastic material is cellular polytetrafluorethylene.

16. A sensor according to claim 11, wherein the lateral support comprises a single ring that is fixed and integral with the housing and that guides the portion of optical wave guide over an entire length of the sensor.

17. A sensor according to claim 11, wherein the lateral support comprises rigid washers arranged one after the other in the housing, along the portion of optical wave guide, the portion of optical wave guide passing through the rigid washers, together with elastic elements that are arranged one after the other in the housing, between the housing and the membrane, alternate with the rigid washers, and that are integral with the rigid washers.

18. A sensor according to claim 17, wherein the elastic elements form a single block of elastic material that traps the portion of optical wave guide.

19. A sensor according to claim 11, wherein the lateral support is fixed to an axial end of the housing opposite the membrane and extends along the optical wave guide toward the membrane.

* * * * *